United States Patent
Trivedi et al.

(10) Patent No.: US 11,858,359 B2
(45) Date of Patent: Jan. 2, 2024

(54) SUPERCAPACITOR ARRANGEMENT FOR ENHANCING ELECTRONIC POWER PERFORMANCE OF WATERBORNE VEHICLES

(71) Applicant: BAE SYSTEMS plc, London (GB)

(72) Inventors: Maneeshi Trivedi, Portsmouth (GB); Christopher Charles Grayson, Portsmouth (GB)

(73) Assignee: BAE SYSTEMS PLC, London (GB)

( * ) Notice: Subject to any disclaimer, the term of this patent is extended or adjusted under 35 U.S.C. 154(b) by 609 days.

(21) Appl. No.: 17/057,334

(22) PCT Filed: May 21, 2019

(86) PCT No.: PCT/GB2019/051395
§ 371 (c)(1),
(2) Date: Nov. 20, 2020

(87) PCT Pub. No.: WO2019/224527
PCT Pub. Date: Nov. 28, 2019

(65) Prior Publication Data
US 2021/0380000 A1   Dec. 9, 2021

(30) Foreign Application Priority Data

May 21, 2018 (GB) .................................... 1808300

(51) Int. Cl.
*B60L 50/40* (2019.01)
*B60L 3/00* (2019.01)
(Continued)

(52) U.S. Cl.
CPC ............. *B60L 50/40* (2019.02); *B60L 3/0046* (2013.01); *H01G 11/08* (2013.01); *H02J 7/345* (2013.01); *B60L 2200/32* (2013.01)

(58) Field of Classification Search
CPC ................................. B60L 50/40; H02J 7/345
(Continued)

(56) References Cited

U.S. PATENT DOCUMENTS 10,581,269 B2 * 3/2020 Valin ....................... H02J 9/061
2010/0133025 A1    6/2010 Flett
(Continued)

FOREIGN PATENT DOCUMENTS

DE       3904161 A    8/1990
EP       1360108 A1   11/2003
(Continued)

OTHER PUBLICATIONS

International Preliminary Report on Patentability received for PCT Application No. PCT/GB2019/051395, dated Dec. 3, 2020. 9 pages.
(Continued)

*Primary Examiner* — Mohammed Alam
(74) *Attorney, Agent, or Firm* — Finch & Maloney PLLC

(57) ABSTRACT

The invention relates to a power system for a vehicle, the power system for a vehicle, the power system comprising a plurality of supercapacitors, a plurality of batteries, at least one electronic load and a master controller, arranged so that at least one battery is connected with at least one supercapacitor, such that power from the at least one battery may be supplied to the at least one supercapacitor, wherein the master controller ability to switch the at least one supercapacitor to a further at least one supercapacitor and wherein at least one battery and/or at least one supercapacitor of the plurality of supercapacitors supplies power to the electronic load.

20 Claims, 4 Drawing Sheets

(51) Int. Cl.
  *H01G 11/08* (2013.01)
  *H02J 7/34* (2006.01)
(58) Field of Classification Search
  USPC .......................................................... 320/103
  See application file for complete search history.

(56) References Cited

U.S. PATENT DOCUMENTS

| | | | |
|---|---|---|---|
| 2011/0183554 A1* | 7/2011 | Daum | B63H 25/42 440/1 |
| 2012/0235473 A1 | 9/2012 | Jiang et al. | |
| 2012/0319471 A1 | 12/2012 | Miller | |
| 2016/0087460 A1 | 3/2016 | Rich et al. | |
| 2018/0131229 A1* | 5/2018 | Valin | H02J 7/35 |
| 2021/0214058 A1* | 7/2021 | Hine | H02S 20/30 |

FOREIGN PATENT DOCUMENTS

| | | |
|---|---|---|
| EP | 2811543 A1 | 11/2013 |
| WO | 20064423 A1 | 8/2002 |
| WO | 2015001222 A1 | 1/2015 |
| WO | 2019224527 A1 | 11/2019 |

OTHER PUBLICATIONS

International Search Report and Written Opinion received for PCT Application No. PCT/GB2019/051395, dated Aug. 9, 2019. 15 pages.
GB Search Report under Section 17(5) received for GB Application No. 1808300.6 dated Sep. 11, 2018. 4 pages.

* cited by examiner

SUPERCAPACITOR ARRANGEMENT FOR ENHANCING ELECTRONIC POWER PERFORMANCE OF WATERBORNE VEHICLES

The invention relates to an arrangement for providing an enhanced power performance for a vehicle comprising electric systems, specifically it relates to the provision of either continuous or on-demand boosts of power for water-borne vehicles.

Power boosters for electronic equipment, in the form of super-capacitors are used in various environments, including the automotive industry to provide an increase supply of power over and above that provided by a main power source, normally a battery. This may be required where an additional supply of power is needed, for example in a vehicle, when a large turning moment (torque) is needed; in this scenario, a large amount of electrical current is required to drive the electro-mechanical elements of the vehicle engine to aid the functionality of the vehicle. After the inertia of the engine/ vehicle has begun, the supercapacitor power source may be either partially or wholly depleted, however whilst the vehicle's main power source can continue, the engine may still operate.

In a vehicle, where a large turning moment, such as torque, is needed and the vehicle operates absent a supercapacitor or other high output power source, the traditional power source, for example a battery, is required to increase its supply of current to engage the motor and obtain the desired effect. In this arrangement however, a battery's flow of electricity is restricted to a low discharge rate, causing strain to be put on the battery, thereby reducing its operating lifetime and degrading its energy storage capacity and performance. Using a supercapacitor may boost the required electricity flow and thereby provide the required electric discharge at the required rate, alleviating battery strain. When compared with the battery, the charge on a supercapacitor depletes at a much faster rate, however as the use of the supercapacitor is required less frequently for the majority of applications, a depleted supercapacitor may then be recharged by the battery so it may be used again later. It is known to use the method above to supply electronic equipment, including those within a vehicle, with an intermittent power boost over a short period, including the repeat use of the method as a series of repeating duty-cycles.

The majority of batteries are not capable of discharging high-levels of current continuously and therefore, if pushed to can become stressed, heat-up and/or succumb to thermal failure or degrade, reducing the number of rechargeable cycles that can be extracted from the battery. Though a supercapacitor can aid a battery, an alternative to the supercapacitor would be a custom designed, high-cost and high-discharge rate battery, comprising a collection of cells. This battery holds a large amount of power, and is capable of rapid discharge of electric current, however this battery is still likely to lack the required energy storage capacity that a lower cost, and energy-dense but discharge-rate-poor battery may have, especially when undertaking long-endurance operational use with multiple duty cycles (recharge-discharge cycles). As a result the use of a custom battery may allow the ability for an instant high power output, however at an increased cost and overall poor power performance. There is therefore an issue in the ability to supply continual power boosts over an extended period as may be required by certain types of electronic equipment, especially where those boosts are required by multiple systems of an electronic device.

The need to supply multiple or continual boosts of electrical power is considered required in modern waterborne vehicles. In traditional waterborne vehicles power is usually provided by mechanical systems, such as an engine with an internal oxygen supply or a special fuel comprising an oxygen source and to the electrical systems by a battery. The engines, having a lot of moving components and chemical reactions, mean that they are often very noisy, which is generally undesirable but until recently has been the only available way of achieving the required output of power. There is an increased desire to move toward the use of electric engines and battery banks in both underwater and water-surface environments to power equipment as well as propulsion with similar power outputs. The switch to electrical drive and operation will allow waterborne systems to have a more simple design and quieter operation at a lower cost. This is important for underwater systems such as torpedoes such vehicles require continual access to high power output from an energy source, for example from a boosted supply of power to its propulsion system and/or actuation of the control surfaces for navigation and course correction and to the sonar system to tackle interference issues or range for both sound navigation and ranging purposes.

It is the aim of the invention to utilise the supercapacitor concept in combination with energy-rich but discharge-poor power sources to provide a variable or sustained power 'boost' to power for a waterborne vehicle, enabling it to be boosted to a desired speed or aid in the transmission of high-power pulses from its on-board systems such as active sonar and/or other non-acoustic communications.

According to a first aspect of the invention, there is provided a power system for a vehicle, the power system comprising a plurality of supercapacitors, a plurality of batteries, at least one electronic load and a master controller, arranged so that at least one battery is connected with at least one supercapacitor, such that power from the at least one battery may be supplied to the at least one supercapacitor, wherein the master controller has the ability to switch delivery of current to the electronic load from the at least one supercapacitor to a at least one further supercapacitor and such that the at least one battery and/or at least one supercapacitor or at least one further supercapacitor of the plurality of supercapacitors supplies power to the electronic load.

The power system allows for a vehicle to operate at and maintain peak power. The system provides access to high electric current, as required, by discharging or partially discharging a first supercapacitor to supply an electronic load, following which a further supercapacitor may be discharged to supply/maintain a similar power to the electronic load. During which time one of the plurality of batteries, having a lower electric current than the supercapacitor, may recharge any one of the discharged supercapacitors while it is not in use. This process may continue through the plurality of supercapacitors, with each supercapacitor being recharged by at least one battery; after which the cycle may begin again with the first supercapacitor, now containing a charge, thereby completing a duty cycle.

In an one arrangement a master battery may be present providing a base level of operational current to the electric load in order that the electric load may function until there is a need for an increase in electrical power.

In the underwater domain, for example torpedoes, as high propulsion speeds require a greater electric current (hence power) to provide the torque needed to drive the electric systems, such as the propulsion systems, in order to maintain speed against hydro-dynamic drag, with the power increasing with the square of the vehicle's travel speed, putting strain on battery only power systems. The power system allows the electronic load of a vehicle or vehicle subsystem, access to a high electric current, while reducing the stress on individual batteries or battery banks, as the load required on the battery is significantly less.

The power system may be used for any vehicle, however where the vehicle is designed for operation on or under water, it mitigates against battery wear.

The electronic load may be an electric propulsion system, sonar system, non-acoustic communications system. The power system may be used to provide a varied or continued boost to the electronic load.

In a further arrangement the power system may further comprise at least one further electronic load, allowing a varied or continued boost in power to be available for a separate subsystem, concurrently with the electronic load. In this arrangement, an underwater system, such as a torpedo may be able to maintain a continuous boost to its electronic propulsion, whilst providing a temporary boost to a system like sonar when required, for example during a period of high-power sonar transmissions.

For a better understanding of the invention, and to show how embodiments of the same may be carried into effect, reference will now be made, by way of example, to the accompanying diagrammatic drawings in which.

Figure 1:
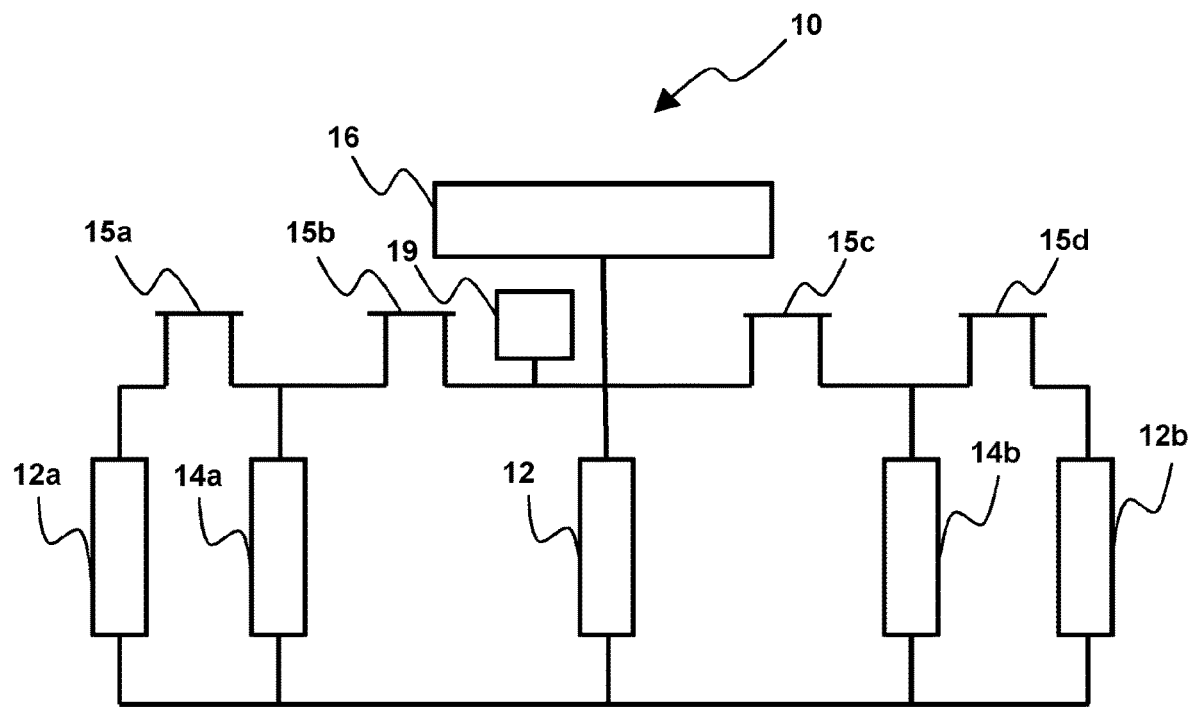
FIG. 1 shows an example power system arrangement schematic of the current invention.

Referring to FIG. 1 there is provided a power system 10, the power system 10 comprising a plurality of batteries 12, 12a and 12b, connected to a plurality of supercapacitors 14a and 14b, connected to an electric load 16, with a master controller 19 present to control the flow of electric current by utilising switching means 15a-15d. In use, the electric load 16 receives a current from a power source such as a master battery 12, however when the electric load 16 requires an increase of current a switching means 15b may move from an open position to a closed position allowing current from a first supercapacitor 14a to be discharged supplying the required electric load 16, if the electric load 16 requires additional or continued power following the complete discharge (or poor performance) of the first supercapacitor 14a, a second switching means 15c may move from an open position to a closed position allowing current from a further supercapacitor 14b to discharge continuing and maintaining the electrical power supply to the electric load 16. In an alternative arrangement, if the current required to the electric load 16 is insufficient by a minor threshold, additional current may be supplied to the electric load 16 from a first battery 12a by closing a further switching means 15a, rather than additional current being supplied by a further supercapacitor 14b. Following the electrical discharge of the first supercapacitor 14a and either whilst the further supercapacitor is discharging or following a return to a standard supply of current from the battery 12, a first battery 12a may recharge the first supercapacitor 14a, by opening the switching means 15b and closing a further switching means 15a, in order that it may recharge and so return to a state wherein it may be able to undergo a subsequent discharge. Once the further supercapacitor 14b has been discharged and if the electric load 16 requires additional or continued power the first supercapacitor 14a may then be operated again, supplying the additional current to the electric load 16, during which time the further supercapacitor 14b may be recharged by the further battery 12b, by the closing of the switching means 15c and opening the further switching means 15d. The master controller 19 controls the flow of current and the power levels of the supercapacitors 14a and 14b by the opening and closing of the switching means 15a-15d. The master battery 12 provides a current to the electric load 16 and so may be connected to the master controller; however it may not be controlled by it.

Figure 2:
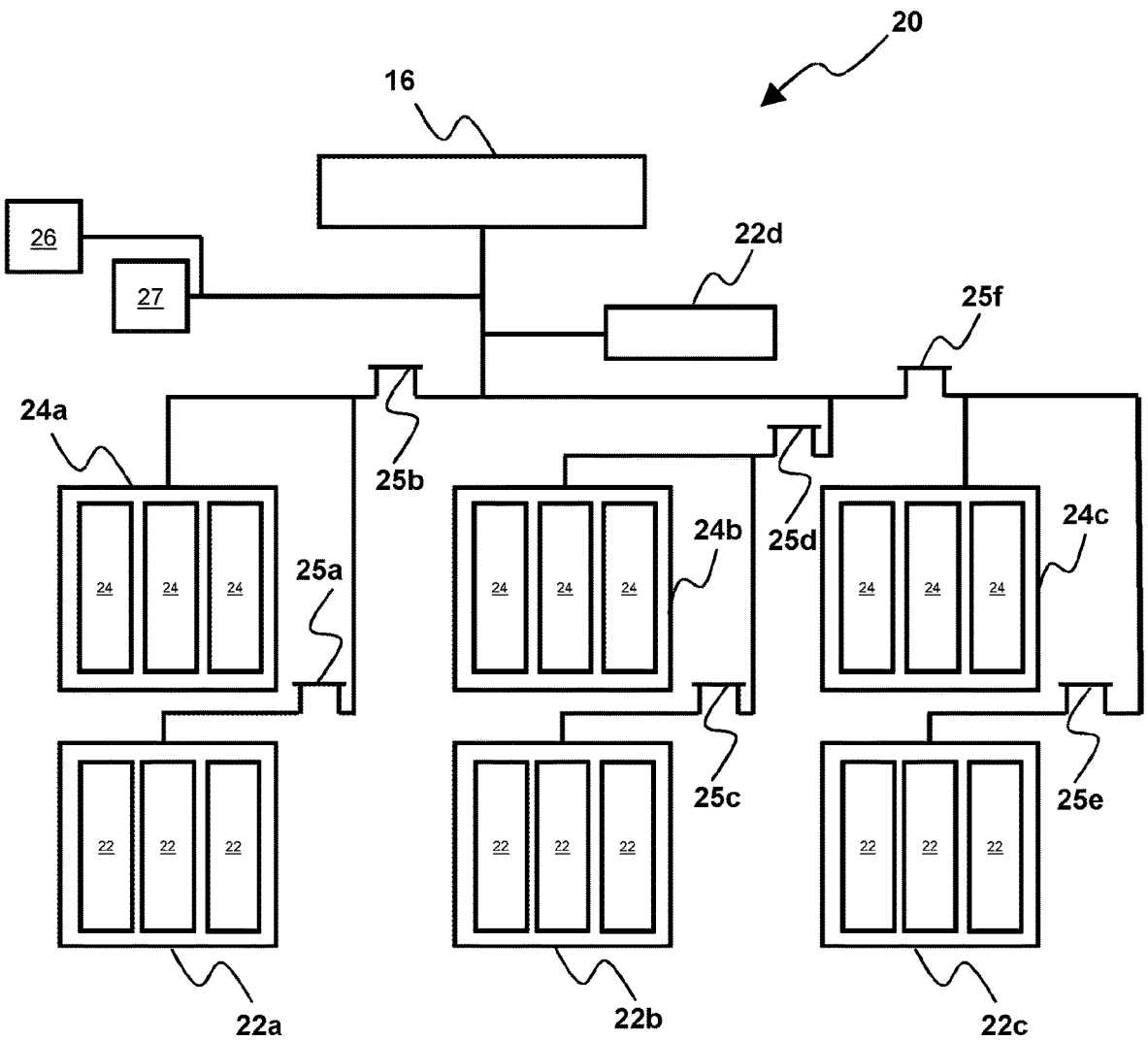
FIG. 2 shows an alternative power system arrangement schematic of the current invention.

Referring to FIG. 2, there is provided an alternative embodiment of the power system 20, providing separate supercapacitor modules 24a comprising at least two supercapacitors 24 and plurality of battery modules 22a comprising at least two batteries 22. This extends the principal of FIG. 1, but allows the battery modules 22a and supercapacitor modules 24a to work together. When the electric load 16 operates, a current is supplied from at least one of the supercapacitors 24 in a supercapacitor module 24a, depending on the electric load 16 requirements. Once at least one supercapacitor 24 in the supercapacitor module 24a has been depleted by up to a designed minimum voltage threshold level of electrical charge, at least one battery 22 from the battery bank 22a can begin to recharge any or all of the supercapacitors 24 in the supercapacitor module 24a, it may be that all the batteries 22 in the battery module 22a collectively recharge each depleted supercapacitor 24 in the supercapacitor bank 24a, consecutively, in order that the speed of recharge is increased.

If additional current is required for the electric load 16, further supercapacitor modules 24b and 24c may be utilised in sequence by the master controller closing switching means 25d and/or 25f as required with corresponding battery modules 22b and 22c recharging depleted, up to a designed voltage threshold level, the supercapacitors 24 of supercapacitors modules 24b and 24c by closing switching means 25c and 25e respectively. If the master controller 26 requires current from the battery modules 22a, 22b and 22c to supply current to the electric load 16, switching means 25b and 25f may be left closed, however if the battery modules 22a, 22b and 22c are utilised to recharge corresponding supercapacitor modules 24a, 24b and 24c then switching means 25b and 25f will be open and 25a, 25c and 25e will be closed, as required. A master battery 22d supply's a current to the electric load continually, however may be supported by additional power as controlled by the master controller 26. For any arrangement, the master controller may provide additional current as a result of timed events or dictated by thresholds on the electric load 16. A voltage stabiliser 27 may also by utilised in the power system 20 in order to control voltage fluctuations that may occur as a result of the oversupply of current from the supercapacitors or a degree of electric interference. The voltage stabiliser 27 will ensure the power supplied to the electric load 16 is stable and so prevent damage to the electric load 16, alternatively if more than one electric load 16 is present the voltage stabiliser may prevent a voltage level to an electric load 16 where it was not intended.

Figure 3:
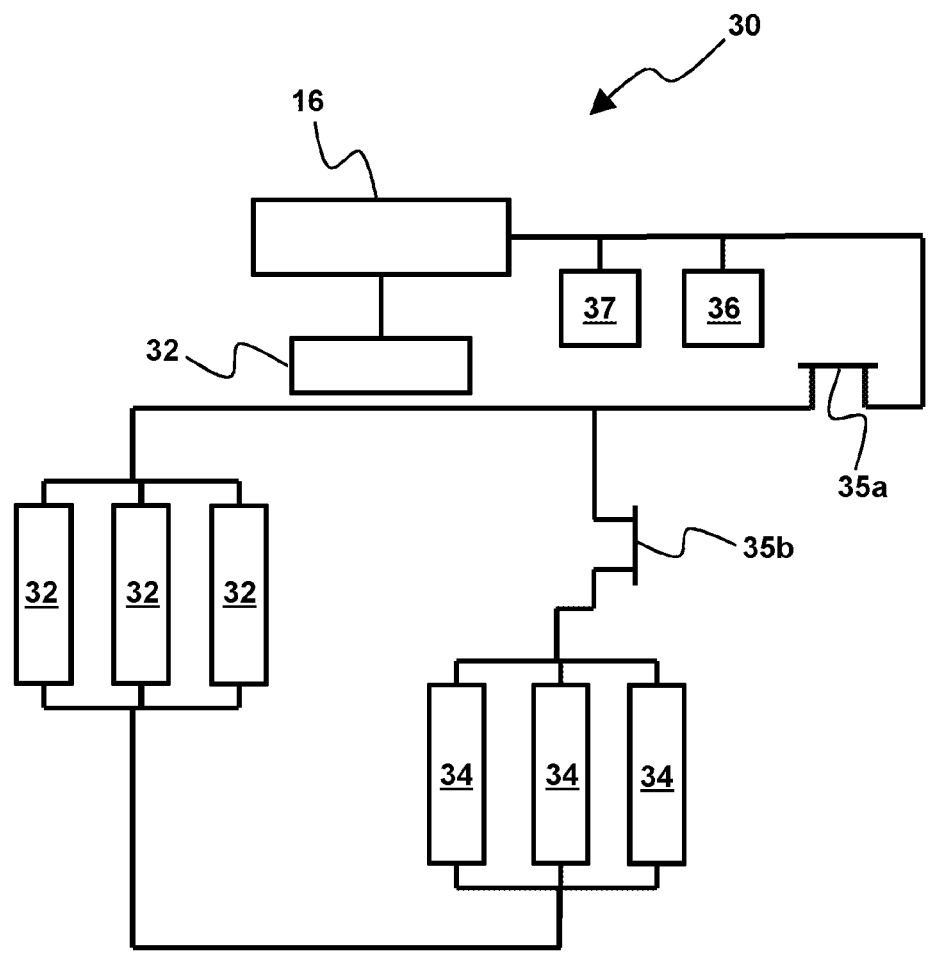
FIG. 3 shows an alternative power system arrangement schematic of the current invention.

Referring to FIG. 3 there is provided a power system 30 with an electric load 16, connected to a plurality of supercapacitors 32, arranged to be connected to the electric load 16 and a plurality of batteries 34, which may be lesser in quantity, the same or more than the quantity of the plurality of supercapacitors 32. The power system 30 may further comprise a voltage stabiliser 37 utilised to maintain a level of electrical voltage to systems during periods of abnormal electrical supply or when other voltage fluctuations occur. The power system 30 may further comprise a master controller 36 to manage the flow of electrical current to the one or more electric loads 16, for example a sonar system or a propulsion system load. The charging and discharging of the supercapacitors 32 can be achieved through the use of switching means 35a and 35b such as logical gates or high voltage switches via the master controller 36 that controls the opening and closing of the switching means 35a and 35b. When supercapacitor 32 is to be charged by the battery 34, switch 35b is closed while switch 35a is opened. When a power boost is required, a supercapacitor 32 output is provided and switch 35a is closed with switch 35b opened. Alternatively switch 35a and 35b may be closed delivering additional current to the electric load 16 concurrently. To recharge the supercapacitors 32 and when additional current is not required to the electric load 16 the switching means 35a may be open and 35b closed to allow one or all of the available batteries 34 to recharge one or all of the supercapacitors 32.

The supercapacitors 32 may be arranged in parallel allowing the electric load 16 to draw from any available supercapacitor 32 containing a charge, allowing the supercapacitors 32 to supply a more rapid supply of electrical current over the connection of the batteries 34 directly to the electric load 16. The supercapacitors 32 may be connected with the batteries 34, arranged in series, in order that any one of the batteries 34 may be available to recharge any of the supercapacitors 32.

By utilising the advantages of the supercapacitors 32 to supply high currents to the electric load 16 as well as the advantage of batteries 34 to supply lower charging current to the supercapacitors, a need for high cost, specially designed batteries are avoided and therefore offer a degree of design freedom when choosing battery-supercapacitor pairings for power system applications.

Figure 4:
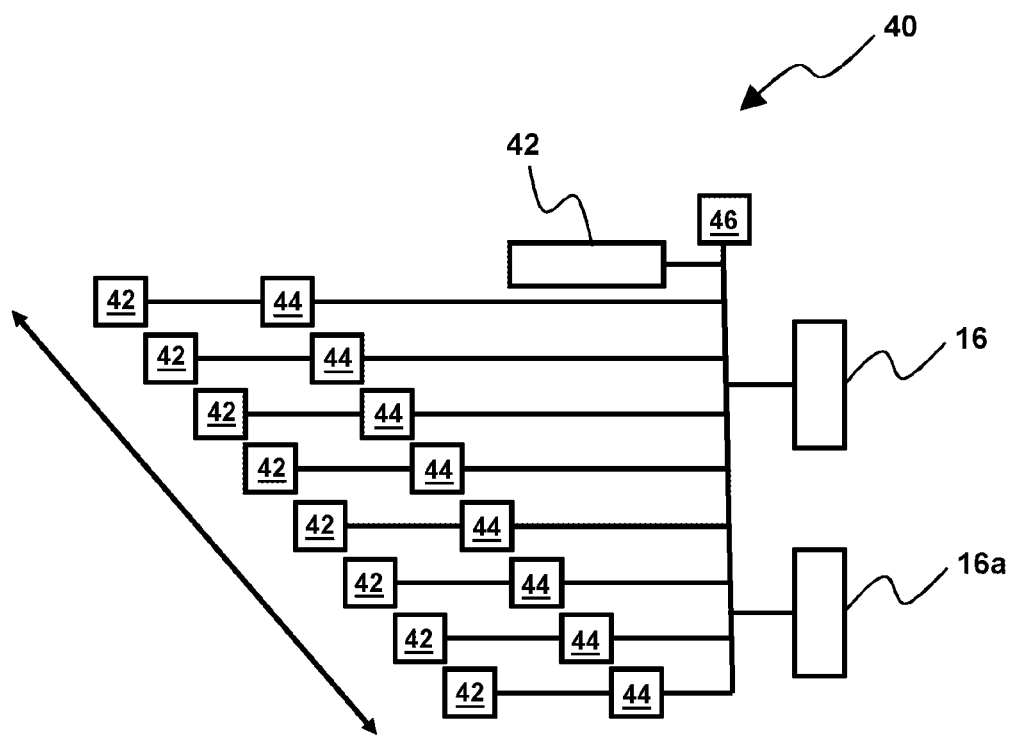
FIG. 4 shows an example of a power system arrangement schematic of the potential operation of a duty cycle.

Referring to FIG. 4, there is provided an example of a power system 40 arrangement comprising a number of batteries 42, connected to a number of superchargers, which are connected to electric load 16 and a further electric load 16a. A master controller 46 is present to control the follow of electrical current between electric loads 16,16a as well as manage the recharging order and supercapacitor activation in relation to electric loads 16, 16a requirements. In one operating order a supercapacitor 44 may completely discharge, up to a designed minimum voltage threshold level and if the electric loads 16, 16a still require a high level of current the master controller 46 may select another supercapacitor 44 to continue the required high level of current to the electric loads 16, 16a. This may be a supercapacitor 44 which is next in parallel to the supercapacitor 44 which has depleted its charge or another that is available. Whilst a supercapacitor 44 is not providing power to an electric load 16, 16a it is recharged by the available batteries 42 as controlled by the master controller 46.

Managing the power in the methods described ensures that the power system is able to operate at peak capacity over extended periods, without increased expense or strain on power system components.

The invention claimed is:

1. A power system comprising:
   a plurality of supercapacitors;
   a plurality of batteries;
   an electronic load; and
   a master controller configured so that at least one of the batteries is connected with at least one of the supercapacitors, such that power from the at least one battery is supplied to the at least one supercapacitor,
   wherein the master controller is configured to switch delivery of current to the electronic load from the at least one supercapacitor to a at least one further supercapacitor, in response to the at least one supercapacitor being at least partially discharged, and
   wherein the at least one battery and/or the at least one supercapacitor or the at least one further supercapacitor supplies power to the electronic load.

2. The system according to claim 1, wherein the at least one electronic load includes an electric propulsion system and/or sonar system and/or other non-acoustic communications system.

3. The system according to claim 1, further comprising at least one additional electronic load.

4. A vehicle comprising the power system according to claim 1, wherein the vehicle is designed for operation on or under water.

5. A vehicle comprising the power system according to claim 1, wherein the vehicle is a torpedo.

6. The system according to claim 1, further comprising at least one voltage stabiliser.

7. The system according to claim 1, wherein the plurality of supercapacitors and the plurality of batteries are divided into separate modules, each module comprising at least two batteries and at least two supercapacitors.

8. The system according to claim 7, wherein any one of the at least two batteries charges any of the at least two supercapacitors.

9. The system according to claim 1, wherein the master controller can switch the at least one battery to a further at least one battery.

10. The system according to claim 1, wherein the plurality of batteries is connected to at least one of the supercapacitors.

11. The system according to claim 1, wherein the system comprises a master battery arranged in parallel with the at least one battery or plurality of batteries and/or wherein the plurality of supercapacitors are arranged in a parallel circuit with the plurality of batteries.

12. A method of electrical energy management, the method comprising:
   discharging energy contents of a first supercapacitor through an electric load;
   discharging energy contents from a second supercapacitor through the electric load;
   recharging the first supercapacitor with at least one battery of a plurality of batteries;
   recharging the second supercapacitor with at least one battery of the plurality of batteries; and
   repeating the discharging and recharging of the first and second supercapacitors throughout operation of electric load, wherein repeating the discharging and recharging comprises
       switching delivery of current to the electronic load from the first supercapacitor to the second supercapacitor, in response to the first supercapacitor being at least partially discharged.

13. A power system, comprising:
   a plurality of supercapacitors including a first supercapacitor and a second supercapacitor;
   a plurality of batteries, including a first battery and a second battery;
   an electronic load including an electric propulsion system or a sonar system; and a master controller configured so that at least the first battery is connectable with at least the first supercapacitor, such that power from the first battery is supplied to the first supercapacitor, wherein the master controller is further configured to switch delivery of current to the electronic load from the first supercapacitor to the second supercapacitor, in response to the first supercapacitor being at least partially discharged, and such that the first battery and/or the first supercapacitor or the second supercapacitor supplies power to the electronic load.

14. The system according to claim 13, further comprising at least one voltage stabiliser.

15. The system according to claim 13, wherein the plurality of supercapacitors and the plurality of batteries are divided into separate modules, each module comprising at least two batteries and at least two supercapacitors.

16. The system according to claim 15, wherein any one of the at least two batteries charges any of the at least two supercapacitors.

17. The system according to claim 13, wherein the master controller can switch the first battery to the second battery, and/or the system comprises a master battery arranged in parallel with at least one of the first and second batteries.

18. A vehicle or torpedo designed for operation on or under water and comprising the system according to claim 13.

19. The system according to claim 1, wherein the master controller is further configured so that the at least one battery is connected to and charges the at least one supercapacitor, while the at least one further supercapacitor delivers current to the electronic load.

20. The system according to claim 1, wherein the master controller is further configured to switch delivery of current to the electronic load from the at least one further supercapacitor to the at least one supercapacitor, in response to (i) the at least one further supercapacitor being at least partially discharged and (ii) the at least one supercapacitor being at least partially charged while the at least one further supercapacitor was delivering current to the at least one electronic load.

* * * * *